United States Patent [19]

Hargrave et al.

[11] Patent Number: 4,583,215

[45] Date of Patent: Apr. 15, 1986

[54] TELEPHONE LINE ACCESS SYSTEM FOR MAIN DISTRIBUTION FRAME

[75] Inventors: Franklin Hargrave, Newtown; Edward J. Linke, Jr., Southbury; Francisco A. Middleton, Newtown, all of Conn.

[73] Assignee: ITT Corporation, New York, N.Y.

[21] Appl. No.: 779,291

[22] Filed: Sep. 19, 1985

Related U.S. Application Data

[63] Continuation of Ser. No. 595,108, Mar. 30, 1984, abandoned.

[51] Int. Cl.$^4$ .............................................. H04J 3/14
[52] U.S. Cl. ....................................... 370/13; 179/98; 179/175.2 R; 361/428
[58] Field of Search ................... 370/13, 58; 179/98, 179/175.3 R, 175.2 R, 175.2 C, 175; 361/426, 428

[56] References Cited

U.S. PATENT DOCUMENTS

| | | | |
|---|---|---|---|
| 3,936,133 | 2/1976 | Splitt et al. | 361/428 |
| 4,035,587 | 7/1977 | Undhjem et al. | 179/98 |
| 4,131,934 | 12/1978 | Becker et al. | 361/428 |
| 4,176,257 | 11/1979 | DeLuca | 361/428 |
| 4,272,141 | 6/1981 | McKeen et al. | 361/428 |
| 4,273,966 | 6/1981 | Briggs et al. | 179/98 |
| 4,288,838 | 9/1981 | Van Der Vegte et al. | 361/428 |
| 4,331,839 | 5/1982 | Baumbach | 361/426 |

*Primary Examiner*—Douglas W. Olms
*Attorney, Agent, or Firm*—Peter C. Van Der Sluys

[57] ABSTRACT

A system for accessing telephone lines at a main distribution frame includes an access block positioned between a vertical input terminal block and protector modules of the distribution frame. The access block has a set of terminals which make direct connection between the corresponding terminals of the input and protector modules and, in addition, includes a printed circuit with individual conductors coupled to respective ones of the access block terminals. Multiplexing circuitry connects with the printed circuit for sequential coupling of messages among the various telephone lines passing through the access block. Additional multiplexing circuitry is located on the distribution frame at a site remote from the input blocks and is coupled to the multiplexers associated with each of the input blocks to scan through the output signals of each of the multiplexers. The scanning operation also includes the operation of providing control and command signals to the multiplexers for sequencing through all of the telephone lines.

11 Claims, 11 Drawing Figures

TO SUBSCRIBERS
OUTSIDE PLANT

TELEPHONE LINE ACCESS SYSTEM FOR MAIN DISTRIBUTION FRAME

This is a continuation of application Ser. No. 595,108, filed Mar. 30, 1984, now abandoned.

BACKGROUND OF THE INVENTION

This invention relates to the main distribution frame used in telephone systems and, more particularly, to an electric circuit and adapter for connection with individual pairs of telephone lines at the sites of their respective lighting or surge protectors.

Telephone systems throughout the United States and in other countries provide for the interconnection of the telephone lines of the subscribers at a wiring support structure known as a main distribution frame (MDF). Such frames support blocks of wire contacts oriented in a vertical attitude and in a horizontal attitude. The terminal blocks having the vertical attitude connect with the pairs of wires (Tip and Ring) which, in turn, connect with the homes and businesses of the subscribers. The horizontal terminal blocks connect with wires which are coupled to the telephone switching equipment by which the subscribers are connected to each other. Connection of pairs of wires are made between the vertical blocks and the horizontal blocks, called cross-connects, to connect outside subscribers to the telephone switching equipment.

Some of the vertical terminal blocks have been in use for many decades. While the form of these blocks has varied somewhat over the years, the general form has been substantially retained. As an exemplary form of vertical terminal block, the block contains groups of sockets, the groups being arranged in rows and columns. For example, there may be five groups in a row and twenty groups in a column. This provides a set of one hundred groups of sockets.

In each group of sockets, two sockets connect with the tip and ring wires going to a subscriber, another two sockets connect with the ring and tip wires coupled to the horizontal terminal block, and a fifth socket connects with ground. Each group of five sockets receives a lightning or surge protector module which is constructed in any one of a number of conventional designs and has five prongs which are inserted into the five sockets.

There is one characteristic of a main distribution frame and the terminal blocks thereon which is of importance in understanding the significance of the invention. This characteristic is the relatively dense packing of the terminal blocks and the wires coupled thereto.

The wires are arranged in harnesses which fill a major portion of the available volume of the main distribution frame. The vertical terminal blocks are arranged in rows and columns, a typical installation having ten vertical terminal blocks arranged in a column, with successive ones of the columns being arranged in side-by-side format. There is relatively little space between the blocks in any one column, and relatively little space between the successive columns by which access may be had to the wire harnesses connected thereto.

There is also a second characteristic of a main distribution frame, which is of significance in appreciating the invention. This is the fragility of the electric wires in the harnesses. Since some of these harnesses have been in place for many decades, the wire insulation may have become sufficiently brittle so as to introduce a significant chance of fracture in the event that they be manipulated. For example, connection of equipment to the wires for access to electric signals carried thereon might require the cutting and bending of the wires to make connection with such external equipment. The resulting manipulation may fracture the insulation or the wires themselves so as to require a rewiring of the main distribution frame. Clearly, such a task would be most undesirable, both in terms of lost time and in terms of expense not to mention interruption of service for a prolonged period of time.

There are many instances where it would be desirable to gain access to the subscriber lines at the main distribution frame. Because of the above-mentioned reasons such access heretofore has been impossible or impractical.

Access to subscriber lines would be useful for test purposes and line monitoring.

It is noted that modern homes and business establishments are provided with one or more telephone lines. In addition, it is also noted that such homes and business establishments may also be provided with a variety of services which are to be monitored. These may include, for example, water, fuel, electric, as well as more recent services such as cable television and alarm services. It has long been the well known practice to have a meter-reader person periodically visit homes and business establishments for the reading of water meters, electric meters, and gas meters.

Telephone lines are used for communication of a large variety of messages, and could be utilized also for the transmission of data relating to the reading of such meters. Indeed, encoders exist for the translation of measured data to a form of electronic signal which can be transmitted via telemetry links, telephone lines, and other forms of communication systems.

Telephone lines are currently in use for the transmission of information from subscriber to subscriber, such information including computer generated signals, video signals of scanned documents, as well as voice signals. Modems are frequently employed for converting digital data signals to a form suitable for transmission over telephone lines, and for converting such transmitted signals back to the digital signal format. In particular, it is noted that all such communication is done on a basis of subscriber to subscriber.

A problem is found when it is desired to transmit information from many subscribers to one recipient of such information. For example, it may be desirable to transmit information from the water meters located at the sites of various subscribers to the water company for automatic monitoring of the usages of water distribution. However, it is noted that, at the present time, such information can only be transmitted via the telephone lines by successively calling up each subscriber to initiate a communication between the subscriber and the water company. Even if a modem and suitable encoding device were connected between the water meter and the telephone line, such communication could only be accomplished by the foregoing calling up of the subscriber by the water company, or by a telephone call being initiated by the subscriber to the telephone company or by equipment at the subscriber premise.

Ideally, the requisite communication between a large number of subscribers and a single subscriber, such as the water company, could be accomplished if the central office equipment were able to support two (or more) paths through the switch simultaneously. An alternate method of providing the service is possible if it were possible to install some form of signal multiplexing equipment directly at the central office of the telephone company. Such equipment could be connected anywhere in the central office between the cable entrance point and the input to the switching equipment normally used for routing telephone conversation traffic. Each point in this path has a problem such as (1) connection to any point between the horizontal part of the main distribution frame and the central office switch would require the coordination of external line equipment and the equipment at the switch, and because not all links between the vertical and horizontal connector blocks may be installed; not all external lines would be available, (2) connection before the vertical connector block is not practical because it requires tapping into a cable; therefore, the access point for such equipment would be at the main distribution frame to the area subscribers.

However, a problem exists in that such connection of multiplexing equipment to the subscriber telephone lines at the main distribution frame is contraindicated due to the brittleness of the wires and the lack of space between the harnesses and between the connector blocks. The problem is complicated by the fact that any connection of such equipment must be accomplished without an interruption of telephone service for any more than a relatively insignificant amount of time. Maintenance of any interconnection equipment such as the multiplexing equipment should also not create interruption in the telephone service.

SUMMARY OF THE INVENTION

The aforementioned problem is overcome and other advantages are provided by a system incorporating the invention to provide access to subscriber telephone lines at a main distribution frame so as to permit multiplexing of the signals of a multiplicity of such subscriber lines to a single subscriber line.

In accordance with a major feature of the invention, access to the subscriber telephone lines is attained by use of the connections presently employed between the lightning or surge protector modules and each of the telephone lines. This is accomplished by inserting a set of access blocks between a vertical block and the lightning protector modules. For example, in the case wherein the vertical block comprises twenty rows of five sets of sockets for connection with a corresponding array of lightning or surge protector modules, ten access blocks may be employed. In this example each access block would provide a coupling for two rows of the lightning protectors. Other combinations of rows and sets could be used such as 1×5, 4×5, etc.

Each access block includes sockets and pins which provide electrical connection between the lightning protector modules and the vertical block. In addition, each block includes further wiring for tapping signals between the telephone lines and multiplexing equipment.

The thickness of an access block is sufficiently small so as to require no more than a slight displacement of the lightning protector modules from their original position. In this way, access is had to all subscriber telephone lines within the limited confines of the main distribution frame. Such access is made without the necessity for the cutting or manipulation of any of the existing telephone lines in the numerous harnesses of the main distribution frame.

One or more integrated circuit (IC) modules comprising multiplexing circuits are attached to each access block. In a preferred embodiment of the invention, two such modules are connected to an access block with each module providing for the multiplexing of the signals of the five telephone lines in one row of the protector modules. Groups of these multiplexing modules are interconnected to create an array capable of concentrating the number of tip ring pairs from up to 100 subscriber lines to a single pair. This pair is then connected to a separate line scan unit. The line scan unit provides for the control of the multiplexing of the signals of the respective modules from a desired telephone line to equipment such as that of the aforementioned water company. The circuitry of the line scan unit may be secured to the main distribution frame at a convenient location and connected to the individual multiplexing modules by means of electrical cabling. The size of the signal cabling between the multiplexing circuits on the access blocks and the line scanner has been reduced by up to 100 times.

Thereby, the access blocks with their multiplexing circuits, as well as the line scan unit, may be readily affixed to and disconnected from a main distribution frame. Such connection and disconnection may be made without interference with the physical arrangement of the harnesses of the telephone lines.

A further advantage, which is a most important consideration in the adaptation of any telephone system, is the fact that the temporary removal of the lightning protector modules, the interposing of the access blocks, and the reconnection of the lightning protector modules, can be done in a relatively short interval of time (on the order of a minute or less). This aspect of the invention avoids any significant interruption in telephone service. Further, the one time interruption to service may be a scheduled interruption.

BRIEF DESCRIPTION OF THE DRAWING

The aforementioned aspects and other features of the invention are explained in the following description, taken in connection with the accompanying drawing wherein.

DETAILED DESCRIPTION

Figure 1:
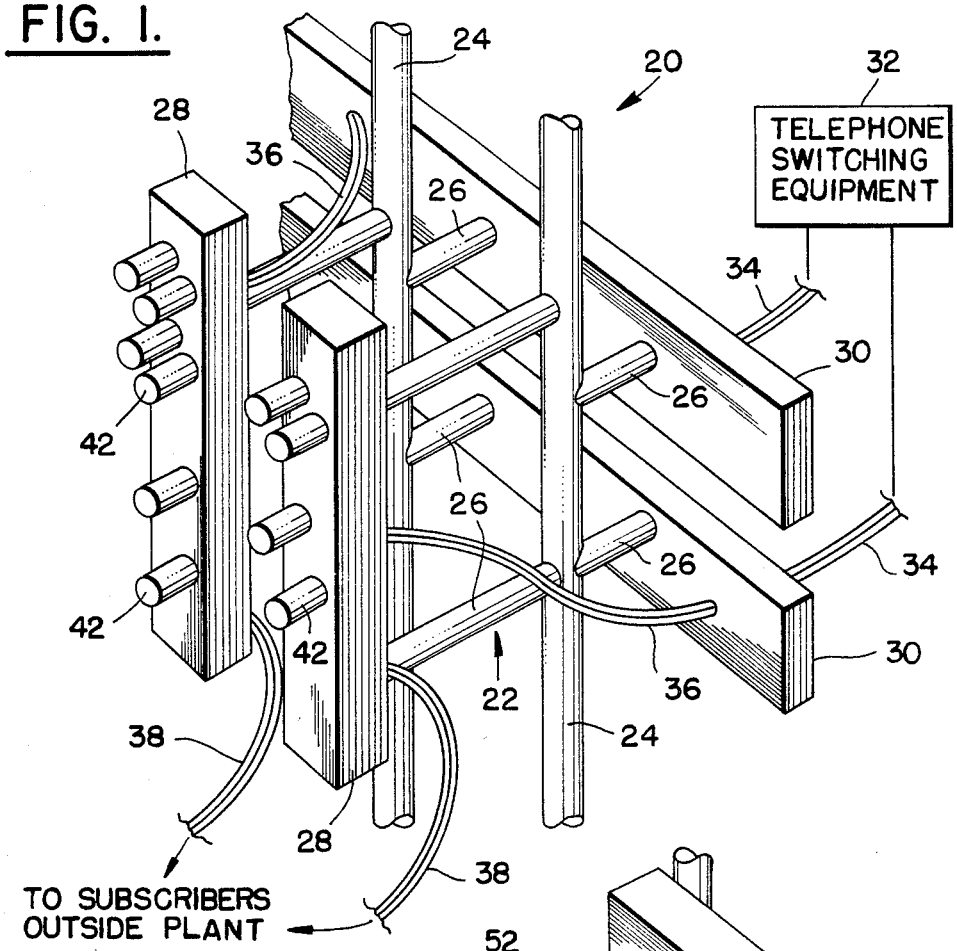
FIG. 1 shows a stylized view of a main distribution frame prior to installation of the access block and multiplexing equipment of the invention.
Figure 2:
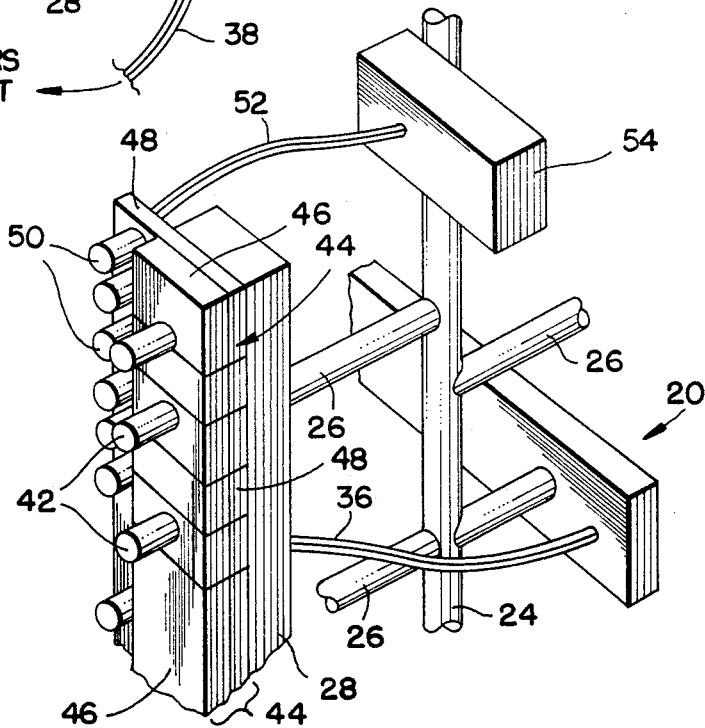
FIG. 2 shows the location of an access block and multiplexing equipment of the invention upon the main distribution frame of FIG. 1.
Figure 3:
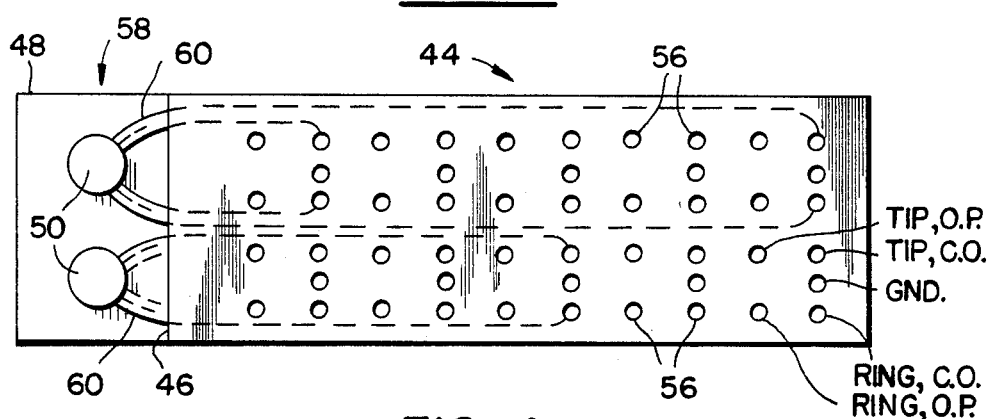
FIG. 3 is a plan view of the access block in FIG. 2.
Figure 4:
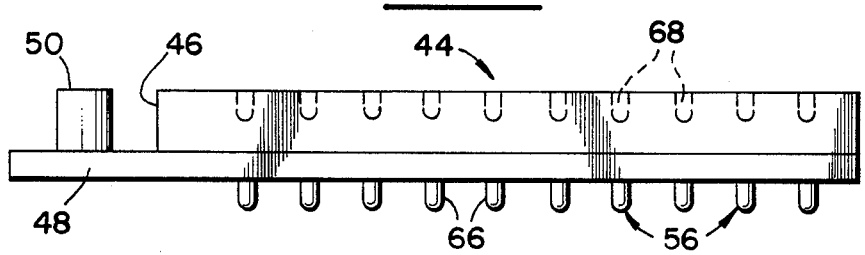
FIG. 4 is an elevational view of the access block of FIG. 2.
Figure 5:
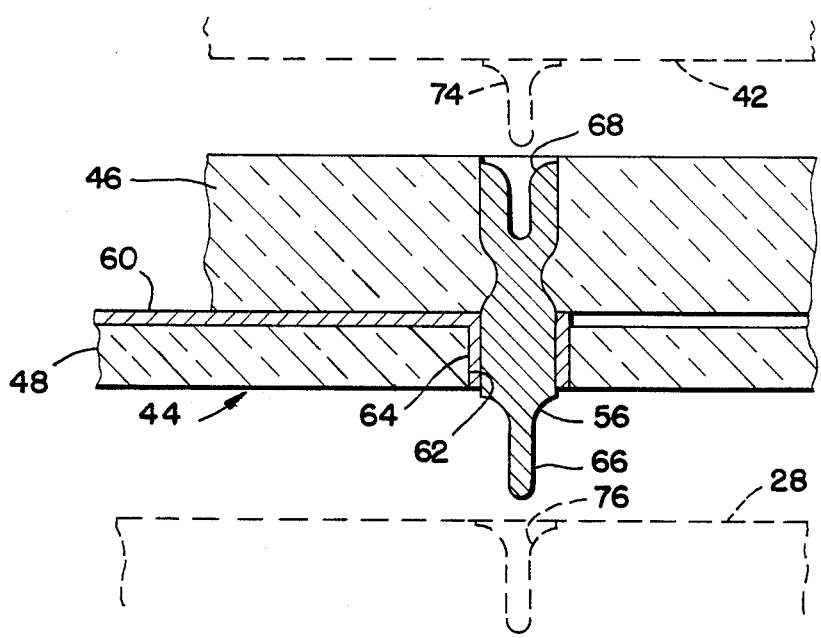
FIG. 5 is an enlarged sectional view of the access block of FIG. 2 showing a terminal passing through the block.

With reference to FIGS. 1 and 2, there is shown a main distribution frame 20 constructed in the form generally utilized in telephone central switching offices. The pictorial representations presented in FIGS. 1 and 2 have been stylized so as to show only those features of a main distribution frame which are essential to an understanding of the invention.

The frame 20 comprises an armature 22 which is formed of upright legs 24 and horizontal struts extending from the legs 24. A set of input vertical terminal blocks 28 and a set of output horizontal terminal blocks 30 are supported at the outer ends of the struts 26.

The horizontal blocks 30 are used for connecting telephone lines to telephone switching equipment 32, indicated diagrammatically, via harnesses 34. Connection of telephone lines between the vertical blocks 28 and the horizontal blocks 30 is accomplished by harnesses 36 called cross connections. Connection of telephone lines between the remote locations of subscribers outside of the plant and the vertical block 28 is accomplished by harnesses 38.

While only a few harnesses are shown in FIG. 1 to demonstrate the connection among the various elements of the frame 20, it is to be understood that numerous harnesses are present, and that such harnesses fill a major portion of the volume of space between the vertical blocks 28 and the horizontal blocks 30. Also, it should be noted that in a typical installation within a telephone central office, there are many tiers of the vertical blocks 28, one above the other, and many tiers of the horizontal blocks 30, one above the other.

In accordance with the usual practice in the construction of main distribution frames a set of lightning or surge protector modules 42 is inserted in connectors found in each vertical block 28 so as to provide electrical connection between the wires of the harnesses 38 and the harnesses 36. The modules 42 comprise an arc protection circuit, which is suitable for protection of the wiring in the central office from electrical discharges, such as lightning or power surges, which may strike telephone lines coupled between the remote subscriber locations and the central office. The vertical blocks 28 serve as a connecting element whereby the individual subscriber telephone lines can be connected via well-known feed-through terminals (not shown in FIGS. 1 and 2) to terminals (not shown in FIGS. 1 and 2) of the protector modules 42.

In accordance with the invention, an access block 44 is positioned between each protector module 42 and its corresponding vertical block 28. This may be seen by a comparison of FIGS. 1 and 2. FIG. 1 shows the arrangement prior to insertion of the access blocks 44 while FIG. 2 shows the arrangement upon insertion of an access block 44 between protector modules 42 and a vertical block 28.

In particular, it is noted that the access block 44 is made sufficiently thin, in accordance with a feature of the invention, so as to fit between protector modules 42 and a vertical block 28 without requiring any significant space in an already crowded central telephone office. In accordance with a further feature of the invention, the access blocks can be inserted without the disruption of the wiring in the harnesses 38 and 36. This arrangement, thereby, insures integrity of the telephone system during installation of the access blocks 44.

While an access block may be formed with the same dimensions of width and length as a vertical connector block, it has been found to be most beneficial to construct the access blocks of a much smaller size. Such smaller size blocks can then be inserted as a set of the access blocks 44, as depicted in FIG. 2, side by side along the interface between protector modules 42 and its corresponding vertical blocks 28. The advantage of this arrangement may be appreciated from a realization that the terminals of the protector modules 42 and of the vertical block 28 may become oxidized, or otherwise roughened so as to require more physical strength, on the part of installation personnel, than would be desirable in the connection of an access block to the vertical block.

Accordingly, the access blocks have been formed as a set of blocks 44 which are substantially smaller than the vertical block. For example, in the case of a vertical block 28 having five protector modules 42 per row, and twenty rows, ten access blocks 44 would be provided for each vertical block 28. Each access block 44 would contain terminals to mate with ten sets of terminals corresponding to the ten protector modules 42 in two rows in the array of modules 42 carried by a block 28.

Thereby, each access block 44 need mate with only one-tenth of the terminals on a complete vertical block 28 so as to greatly facilitate the interconnection of an access block 44 with a vertical block 28. During the installation of the access blocks 44, the blocks would be installed one at a time in side-by-side arrangement along a vertical block 28. The access blocks can be loaded with protector modules 42 prior to insertion of the access block into the vertical block 28. Thus, installation of an access block would require the following steps: (1) insert 10 modules into an access block; (2) remove 10 modules from the vertical block; and (3) insert the access block into the vertical block. With this procedure, the time that a line would be interrupted would be a matter of seconds.

With reference also to FIGS. 2-5, each access block 44 comprises a base 46, a board 48 having a printed circuit thereon, and two multiplexers 50 constructed in the form of IC modules. All of the multiplexers 50 on the set of ten access blocks 44 supported by a single vertical block 28 are coupled via a harness 52 to a line scan unit 54 which is mounted on a leg 24 of the frame 20.

In each access block 44, the base 46 may be secured to the board 48 by an adhesive, or other well known mounting means such as screws (not shown) to provide rigidity to the block 44. The board 48 extends beyond the end of the base 46 to provide space for housing the multiplexers 50. One multiplexer 50 is provided for each row of the protector modules 42 and, accordingly, services five sets of telephone lines corresponding to the row of five protector modules 42. Thus, the two multiplexers 50 in each access block 44 service a total of ten subscriber telephone lines.

Each access block 44 further comprises an array of feed-through terminals 56 set within the base 46, and a printed circuit 58 disposed on the board 48. Individual conductors 60 of the printed circuit 58 connect the multiplexers 50 with specific ones of the terminals 56 as will be described more fully with reference to FIGS. 3 and 6.

Each terminal 56 passes through an aperture 62 in the board 48, each aperture 62 having a metallic, cylindrical insert 64 which makes a press fit, or solder connection with a terminal 56 so as to insure electrical connection therewith. Each of the conductors 60 terminates at an insert 64 to provide the foregoing electrical connection between a terminal 56 and a multiplexer 50.

Figure 6:
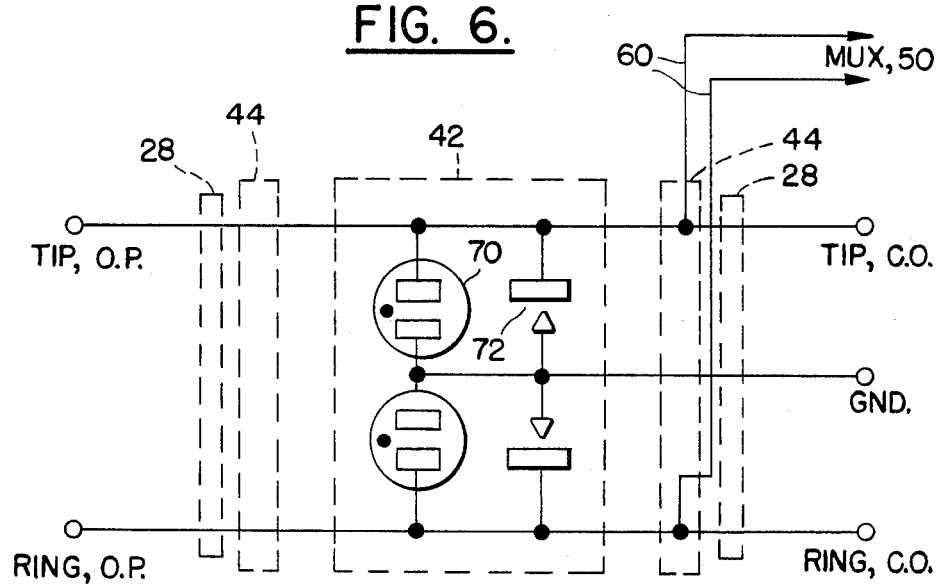
FIG. 6 is a schematic diagram of a lightning or surge protector module shown in FIGS. 1 and 2.

In FIG. 6, a module 42 is shown to have a protector circuit comprising a pair of gas-discharge devices 70 and a pair of fusible-pellet devices 72 which connect the tip and ring wires to ground. In the event that an excessively large voltage surge appears on the tip and/or ring wires, as would happen upon the occurrence of a lightning bolt, the devices 70 and 72 conduct the resulting current to ground so as to protect the equipment on the central office (C.O.) side of the module 42.

As shown in FIG. 6, the tip and ring wires pass from a location which is the outside plant (O.P.) through the blocks 28 and 44, respectively, to reach the protector module 42. Thereafter, the tip and ring wires continue to pass by the blocks 44 and 28, respectively, to reach the switching circuitry of the central office. Connection of the conductors 60 of a multiplexer 50 to the tip and ring wires is made in the access block 44 between the module 42 and the central office circuitry.

FIG. 6 shows a total of five terminals for the protector module 42, these corresponding to the incoming and outgoing tip and ring wires, and the ground wire. The corresponding five terminals in each set of terminals is also portrayed in FIG. 3. The layout of the feed-through terminals 56 in the access block 44 of FIG. 3 corresponds to the arrangement of the pins (not shown) of a protector module 42. The connection of the conductors 60 to the tip and ring wires for the central-office side of each of the modules 42 is also disclosed in FIG. 3 wherein a few exemplary ones of the conductors 60 are shown passing between the top surface of the board 48 and the bottom surface of the base 46.

Each feed-through terminal 56 is provided with a pin 66 at one end thereof and a socket 68 at the opposite end. The socket 68 receives a pin 74, shown in phantom in FIG. 5, of the protector module 42. The pin 66 mates with a socket 76 of the vertical block 28. Thereby, the configurations of the individual ones of the terminals 56 and their arrangement conforms to that of the sockets 76 of the vertical blocks 28 so as to permit the physical and electrical connection between the block 44 and the block 28.

Figure 7:
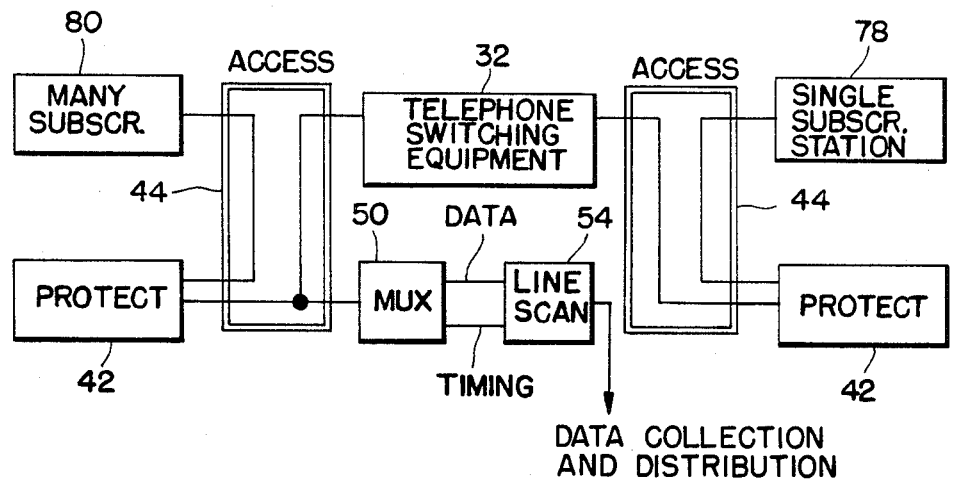
FIG. 7 is an electrical block diagram showing the interconnection of the access blocks of FIG. 2 with other elements of the telephone system including the multiplexing apparatus of the invention.

FIG. 7 shows the electrical interconnection between the many telephone subscribers who are to be serviced by the invention, and a single data collection and distribution port which receives data from the many data transmitting subscribers 80.

Two forms of communication exist between the subscribers 80 and destination terminating equipment. First, there is the usual telephone connection via the telephone switching equipment 32. This mode of communication is available when one of the subscribers 80 telephones the station 78. For such communication, the telephone line passes from the subscriber 80 via the access block 44 and a protector module 42 to the telephone switching equipment 32 and, thereafter, via an access block 44 and a protector module 42 to the station 78.

The second mode of communication, made possible by the invention, comprises a multiplexer 50 and the line scan unit 54. If desired, the multiplexing unit 50 may comprise well known switching circuitry by which each of the five subscriber lines coupled thereto may be connected to the scan unit 54 for communication of data thereto.

The scan unit 54, if desired, may also comprise well known switching circuitry by which the output data of each of the multiplexers 50 of an access block 44 may be scanned so as to successively output the data of the various subscriber lines associated with each of the multiplexers 50. The data outputted by the scan unit 54 is then routed to the data collection and distribution port for collection and routing to switching equipment for data distribution. The scan unit 54 may comprise timing circuitry for sequencing the switching of the successive subscriber lines. Such switching can be accomplished manually or automatically if suitable switching circuitry is provided.

Figure 8:
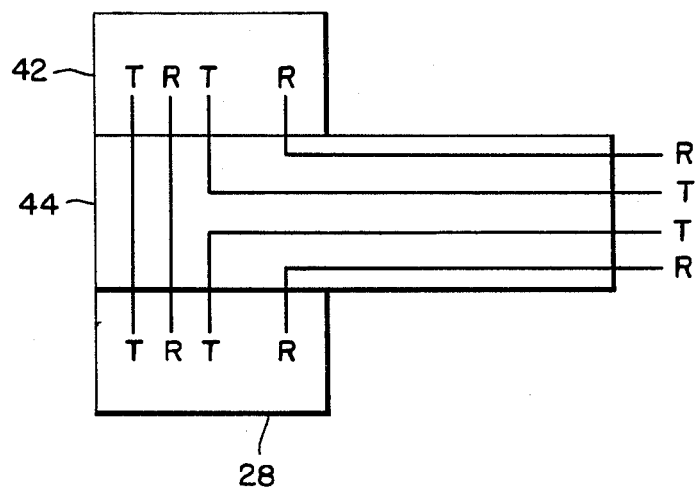
FIG. 8 is a schematic diagram of another embodiment of an access block involving line intercept rather than bridge or Tee tapping.

The above describes an access block that provides a Tee connection to the tip and ring pair. It may be desirable to provide an intercept connection as shown in FIG. 8 wherein each of the tip and ring wires are brought out of the access block so that a device could be inserted in series if desired.

Thereby, the foregoing access blocks 44 have made it possible to intercept communications along telephone lines without any physical intrusion into the harnesses of the main distribution frame. In addition, the removal of the protector modules 42, followed by the insertion of a preloaded access block 44 can all be done within a sufficiently small interval of time to insure no more than a negligibly small interruption of telephone service.

Figure 9:
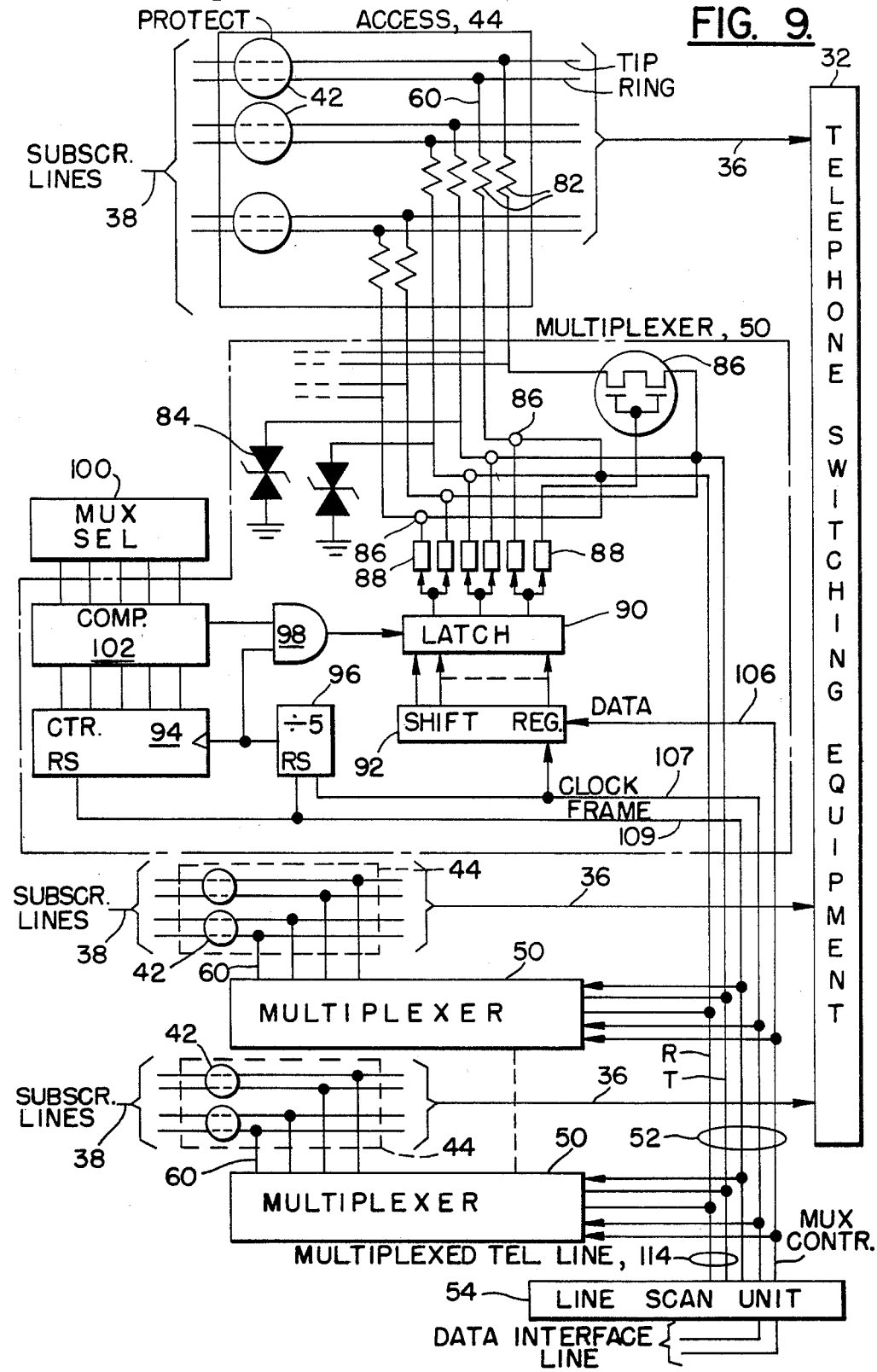
FIG. 9 is a block diagram showing the electrical components of a multiplexer and the interconnection of a set of multiplexers with the line scan unit of FIG. 2.

FIG. 9 shows further details on the interconnection of the multiplexers 50, associated with the various access blocks 44, to the line scan unit 54. In addition, FIG. 9 shows details of the multiplexing circuitry within a multiplexer 50.

The various harnesses 38 of the subscriber lines are coupled via the protector modules 42 and the access blocks 44 to the harnesses 36 for connection with the telephone switching equipment 32. The connection of each multiplexer 50 to its corresponding set of subscriber telephone lines is accomplished at an access block 44 in accordance with the foregoing description.

In addition, it is advantageous to employ further protection against surge voltages and arcs. Such further protection can be provided by series resistors 82 connected to the printed circuit conductors 60 (FIG. 5), the ends of the resistors 82 adjacent to a multiplexer 50 being grounded via back-to-back zener diodes 84. Thus, a small surge which may not trip the protector module 42 or the surge caused by the turn on delay of the primary protector would develop a voltage drop across the resistors 82, this voltage drop being limited to a safe value by the zener voltage. Resistors 82 are preferably discrete devices mounted to circuit board 48.

Each multiplexer 50 comprises a set of electronic switches 86 set within the telephone lines for making and breaking electrical connection therewith. Each switch 86 comprises a pair of high voltage transistors including drive and isolation circuitry for example, the high voltage switch as is disclosed in the U.S. Pat. No. 4,170,740 issued in the name of Pernyeszi on Oct. 9, 1979 and assigned to the assignee hereof. This patent is incorporated by reference herein in its entirety. The drive circuits for the switches 86 are shown in FIG. 9 as blocks 88. The drive circuits 88 receive control signals from the output terminals of cells of a latch 90. The drive circuits 88 are understood to include a source of clock pulses, or may be activated by an external source of clock pulses (not shown), as is disclosed in the foregoing patent.

Each multiplexer 50 further comprises a shift register 92, a counter 94, a divide by five divider 96, an AND gate 98, and a comparator 102. A Mux select circuit 100 is also provided to connect five leads from the comparator 102 selectively to a logic 1 or 0 to thereby code and identify the particular multiplexer. Command signals for operating the multiplexer 50 are provided as a series of digital bits on line 106 from the scan unit 54 to the shift register 92. The bits are clocked into the shift register 92 by a clock signal provided on a line 107 from scan unit 54. The series of bits is converted to a set of parallel digital signals which are fed via output terminals of the register 92 to the latch 90 when latch 90 receives a load signal from gate 98.

Line 106 provides a series of bits with only one positive or one level bit each frame. The location of the bit within the frame will decide which subscriber line is to be selected and connected to the scan unit via lines 114. The bits from line 106 are continuously clocked through register 92. Each successive set of five bits will represent a multiplexer.

A frame sync signal is provided on line 109 from the scan unit 54 and is connected to the divide by five divider 96 and the counter 94 for resetting the divider and counter at the state of each frame. For every fifth clock pulse, divider 96 provides a pulse to counter 94 which stores a binary number corresponding to the pulses received. Thus, counter 94 will count modulo 5 and its count will represent in binary the numbers of the multiplexers from 1 to 20 for example.

Comparator 102 compares the number in counter 94 with the multiplexer number selected in multiplexer selector 100 and when a true comparison is made an output is provided to gate 98. When gate 98 receives the divider output, it instructs the latch 90 to load the data that is in the shift register 92.

Figure 11:
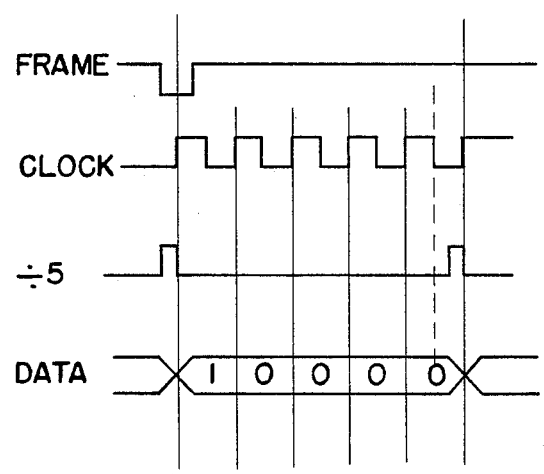
FIG. 11 is a timing diagram.

Referring to FIG. 11, there is shown how the single one level bit from line 106 may be shifted across the register 92 and loaded into the latch 90 when the appropriate multiplexer number is sensed by the comparator.

Latch 90 has five outputs, one for each of the driver circuits 88. When the multiplexer number is sensed, a logic level 1 will appear at one of the five latch outputs to activate one of said driver circuits.

It is to be appreciated that the logic level one bit will pass through the shift registers of all multiplexers but will only be latched into latch 90 of the multiplexer whose multiplexer select circuit is providing a binary number corresponding to the number in counter 94. Every five clock pulses a different multiplexer will attempt to latch data from shift register 92; however, the register will have all zeros except when the appropriate multiplexer attempts to latch data. A multiplexer will only be activated when there is coincidence between the multiplexer number and the presence of data in the shift register.

Using the addressing procedure just described, a specific one of the switches 86 is addressed for coupling a specified subscriber telephone line into the harness 52 for transmission of messages to the scan units 54. The connection made by the switches 86 permits two-way propagation of electric signals so that messages may also travel from the scan unit 54 via the selected telephone line in the multiplexer 50 to the designated subscriber.

Figure 10:
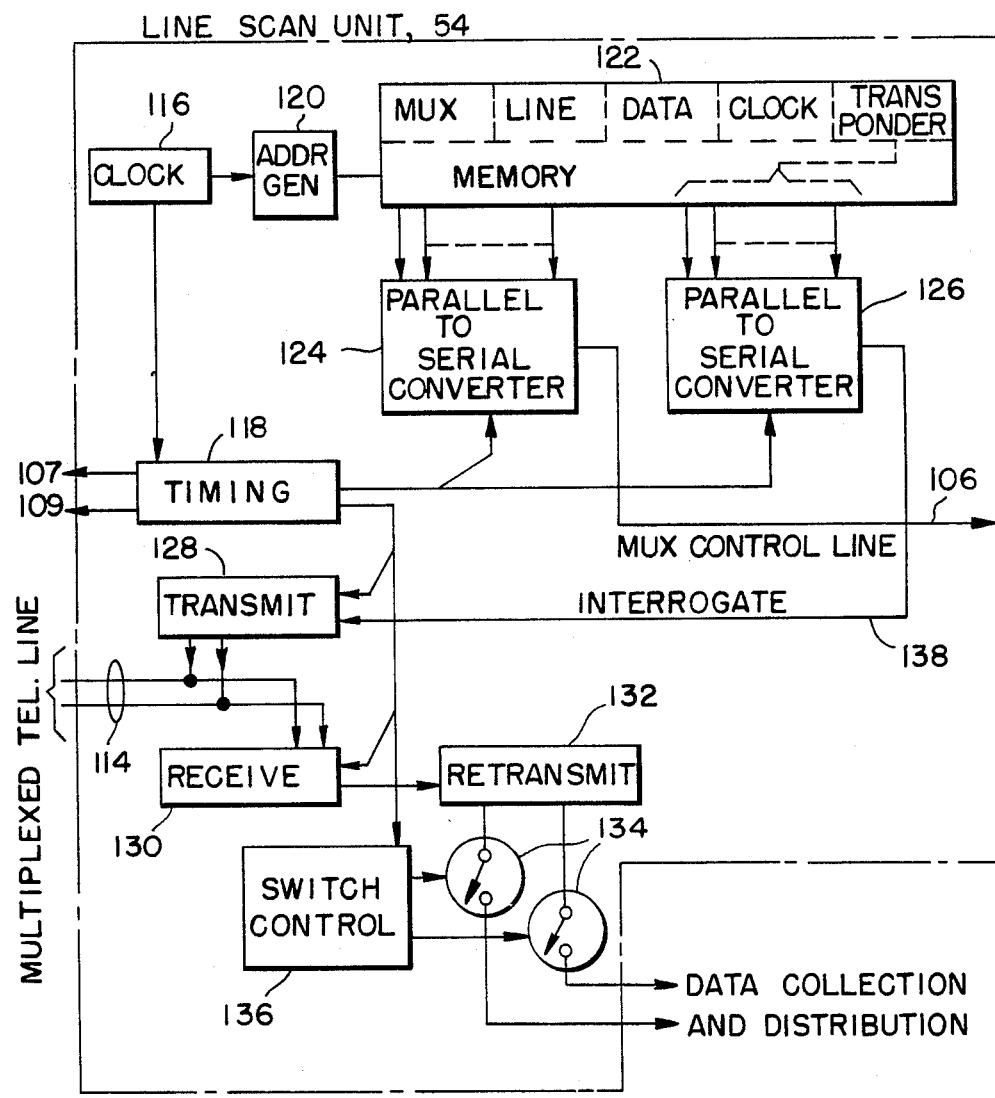
FIG. 10 is a simplified block diagram of circuitry suitable for the line scan unit in the selection of telephone lines from the various multiplexers.

With reference to FIG. 10, the construction of the scan unit 54, and its interconnection via the lines 106 and 114 to the multiplexers 50 (FIG. 9) is more fully described. The scan unit 54 comprises a clock 116, a timing unit 118, an address generator 120, a read-only memory 122, and two converters 124 and 126 for converting data from a parallel format to a serial format. It is to be understood that this description of the scan unit 54 is presented by way of example in order to more fully explain the operation of the system of the invention, and that circuitry which is more complex than that shown may be employed to accomplish various control functions that may be desired.

The control signals to be transmitted serially along the line 106 are initially stored in the memory 122. Upon addressing a specific section of the memory 122 by the generator 120, the stored bits of the signal on line 106 are read out of the memory 112 along parallel lines to the converter 124 which then converts the data from the parallel format to the series format for transmission along the line 106.

The clock 116 provides clock pulses for operating the address generator 120 as well as the timing unit 118. By way of example, the address generator 120 may comprise a well known program counter which permits communication with all of the subscribers by the time division multiplex system. The timing unit 118 provides clock and timing signals for the operation of both the converters 124 and 126. In addition, the timing unit 118 provides the clock and frame sync signals to the multiplexers on lines 107 and 109, respectively.

As portrayed in the figure, the memory 122 stores the address of the specific multiplexer which is to be activated, the specific telephone line of the multiplexer, the data bit, and the clock and synchronization signals which were referred to in the description of FIG. 9. In addition, the memory 122 stores an interregation signal for interregating a transponder at the site of each telephone subscriber as will be explained below.

The scan unit 54 further comprises a transmitter 128, a receiver 130, a retransmission circuit 132, switches 134 and a switch control 136. The transmitter 128 transmits an interrogation signal via the telephone line 114 to the location of the subscriber which has been addressed by the signal on line 106.

As has been noted herein above, it is anticipated that the water meters, electric meters, and other such sources of information are to be connected to a transponder unit (not shown) which, in response to an interregation signal, transmits digitally encoded data from the subscriber via a telephone line in the harnesses 38 to the central office of the telephone company. In order to insure that such transponder is not accidentally triggered by noise on the telephone line, the interrogation signal is coded specifically for each transponder unit. Accordingly, the memory 122 stores a set of interrogation signals, with each signal having the specific code to which the corresponding transponder responds.

Upon addressing of the memory by the generator 120, the interrogation signal is read out of the memory 122 to the converter 126 and is then converted from the parallel format of digital data to a serial bit stream which is fed via line 138 to the transmitter 128. The transmitter 128 is coupled to the telephone line 114 for transmission of the interrogation signal to the desired subscriber telephone line and its associated transponder unit, which subscriber has been addressed by the address stored in the memory 122.

Upon receipt of the data from the transponder along line 114 by the receiver 130, the data is then outputted by the receiver 130 to the circuit 132 for transmission via the wiring of the main distribution frame 20 (FIGS. 1 and 2) to the subscriber stations, such as the water company, which is to receive the data. The retransmission circuit 132 is connected directly to the data collection and distribution equipment by switches 134.

Preferably, the switches 134 are of the same form as the switches 86 described with reference to FIG. 9. Thus, the switches 134 are controlled by electronic circuitry in the controller 136. The timing unit 118 provides timing signals for strobing the operation of the transmitter 128, the receiver 130 and the switch controller 136 so as to insure their respective operations in the proper time sequence. Thus, the receiver 136 would be activated subsequent to the transmission of the transmitter 128 so as to receive the transponders response to the interregation signal.

In addition, the controller 136 is to be operated for coupling the circuitry 132 to the station telephone line only at the interval of time wherein data is to be transmitted to the station. At other times, the switches 134 would be open to permit normal use of the station telephone line for regular telephone conversational use.

The foregoing description of the multiplexer and scan unit demonstrates how time division multiplexed signals can be communicated between many subscribers and a single subscriber station by use of the access blocks positioned between the vertical input terminal blocks and the protector modules in accordance with the invention. Also, the use of the electronic switches, as disclosed in the foregoing patent, permit two-way transmission of messages whereby both interrogation and data signals can be communicated over the telephone line, while maintaining electrical isolation between groups of lines in a multiplexer group.

It is to be understood that the above described embodiment of the invention is illustrative only, and that modifications thereof may occur to those skilled in the art. Accordingly, this invention is not to be regarded as limited to the embodiment disclosed herein but is to be limited only as defined by the appended claims.

We claim:

1. A system for accessing individual subscriber telephone lines at a main distribution frame, to enable communication between a plurality of subscriber stations and a station, the frame including an input block having a field of terminals wherein individual sets of terminals connect with respective ones of the subscriber lines, said frame further including a plurality of protector modules each having a field of terminals which mate with the terminals of the input block, there being a set of arc protection devices supported in each of said protector modules and connected with corresponding ones of said terminal sets upon coupling of said protector modules with said input block, said system comprising:
    at least one access block in juxtaposition with said input block, said access block having a first and second set of terminals for mating respectively with the terminals of said protector modules and the sets of terminals of said input block;
    multiplexing circuits associated with one or more access blocks and including means for connecting said multiplexing circuits to terminals in each of said sets of terminals of said access blocks; and
    a line scan unit connecting with each of said multiplexing circuits for communication therewith, said line scan unit including means for addressing individual ones of said multiplexing circuits for communication between said station and individual ones of the subscriber stations at an access block, each of said multiplexing circuits further comprising means for switching a subscriber line via said scan unit to said station, thereby to provide a communication link between a subscriber station and said station.

2. A system according to claim 1 wherein each of said access blocks comprises a base which rigidly supports the terminals of said access block, said multiplexing circuit is supported at one end of said base, and said connecting means is constructed in the form of a printed circuit comprising a set of conductors supported on said base.

3. A system according to claim 2 wherein, in each of said access blocks, said printed circuit includes a board having an array of apertures formed with electrically conductive inserts set into said board, the terminals of said access block are feed-through terminals held by respective ones of said inserts, and said conductors of said connecting means make electrical connection with said inserts.

4. A system according to claim 3 wherein said sets of terminals in one of said access blocks are located in an arrangement comprising in two rows disposed along said base, said one access block comprising two of said multiplexing circuits with one of said multiplexing circuits being connected to terminals of a first row and the second of said multiplexing circuits being connected to terminals of a second row.

5. A system according to claim 4 wherein each of said multiplexing circuits comprises:
    a detector of an address transmitted by said addressing means of said scan unit, said address comprising groups of bits wherein each bit designates a subscriber line coupled to a multiplexer and the number of groups designates a multiplexer, said detector comprising means for counting said groups and means for comparing a count of said counting means with a reference, thereby to detect the address of a multiplexer;
    register means for storing a switch-control signal, said register means including a shift register which receives said address bits; and wherein
    said register means is strobed by said detector to transmit a switch-control signal to said switching means corresponding to a designated subscriber line.

6. A system according to claim 1 wherein each of said multiplexing circuits comprises:
    a detector of an address transmitted by said addressing means of said scan unit, said address comprising groups of bits wherein each bit designates a subscriber line coupled to a multiplexer and the number of groups designates a multiplexer, said detector comprising means for counting said groups and means for comparing a count of said counting means with a reference, thereby to detect the address of a multiplexer;
    register means for storing a switch-control signal, said register means including a shift register which receives said address bits; and wherein
    said register means is strobed by said detector to transmit a switch-control signal to said switching means corresponding to a designated subscriber line.

7. A system according to claim 1 wherein said station is a data collection and distribution station.

8. A system according to claim 1 wherein said station is a test station.

9. A system for accessing individual subscriber telephone lines at a main distribution frame to enable multiplexed communication of data between subscribers and a station, said frame including a plurality of terminal blocks interconnected by electric-wire harnesses of telephone subscriber lines, there being input terminal blocks with arc-protector modules connected thereto, said system comprising:

a plurality of access blocks disposed in juxtaposition with said input blocks and having feed-through means for coupling terminals of subscriber telephone lines of said input blocks with corresponding terminals of said protector modules, each of said access blocks further comprising means for multiplexing communications of telephone lines associated with said feed-through means, said multiplexing means being coupled to said feed-through means; and scan means coupled to the multiplexing means in respective ones of said blocks for addressing individual ones of said multiplexing means and for designating individual telephone lines at the respective multiplexing means, said scan means further comprising means coupled to said multiplexing means for communicating telephone subscriber data therefrom to said station.

10. A system according to claim 9 wherein an output port of said scan means is connected via one of said access blocks to a telephone line of a subscriber.

11. A system according to claim 9 wherein said scan means includes means for transmitting an interrogating signal along a subscriber telephone line which has been designated by said scan means, said multiplexing means including means for electronically switching telephone lines to said scan unit, and wherein said switching means permits two-way communication of signals between a subscriber and said scan means.

* * * * *